United States Patent
Expósito

(10) Patent No.: US 6,659,677 B1
(45) Date of Patent: Dec. 9, 2003

(54) PANEL CONNECTOR

(75) Inventor: Alejandro Rosales Expósito, Alcaudete (ES)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 09/697,576

(22) Filed: Oct. 26, 2000

(51) Int. Cl.$^7$ ............................. B25G 3/00; F16B 13/10
(52) U.S. Cl. ........................ 403/24; 403/292; 403/314; 403/375; 403/381; 403/409.1
(58) Field of Search ................................ 403/381, 404, 403/408.1, 409.1, 4, 11, 24, 292, 298, 294, 297, 314, 300, 375, DIG. 10, DIG. 11, DIG. 12, DIG. 13, DIG. 14

(56) References Cited

U.S. PATENT DOCUMENTS

| | | | |
|---|---|---|---|
| 4,057,356 A | 11/1977 | Nissen | 403/219 |
| 4,097,100 A | 6/1978 | Sauder | 312/257 A |
| 4,163,618 A | 8/1979 | Giovannetti | 403/245 |
| 4,236,558 A | 12/1980 | Sabo | 144/318 |
| 4,341,485 A | 7/1982 | Appleby et al. | 403/231 |
| 4,357,119 A | 11/1982 | Pollitt | 403/231 |
| 4,487,522 A | 12/1984 | Appleby et al. | 403/231 |
| 4,493,582 A | 1/1985 | Drabsch | 403/382 |
| 4,639,161 A | 1/1987 | Mazaki | 403/245 |
| 4,883,331 A | 11/1989 | Mengel | 403/14 X |
| 4,893,958 A | 1/1990 | Wieland | 403/7 |
| 5,019,199 A | 5/1991 | Menke et al. | 156/245 |
| 5,069,506 A | 12/1991 | Wieland | 297/440 |
| 5,359,944 A | 11/1994 | Steinbeck | 403/294 |
| 5,499,886 A | 3/1996 | Short et al. | 403/381 |

FOREIGN PATENT DOCUMENTS

| | | |
|---|---|---|
| EP | 0 051 700 | 5/1982 |
| EP | 0 572 025 A3 | 12/1993 |
| EP | 0 572 025 A2 | 12/1993 |
| EP | 0 832 582 A2 | 4/1998 |
| EP | 0 832 582 A3 | 1/2000 |
| GB | 1 263 342 | 2/1972 |
| WO | PCT/IB96/00911 | 3/1997 |
| WO | PCT/RO98/00001 | 8/1998 |
| WO | PCT/CH98/00434 | 4/2000 |

*Primary Examiner*—Christopher J. Novosad
(74) *Attorney, Agent, or Firm*—Kwadjo Adusei-Poku; Lloyd D. Doigan

(57) ABSTRACT

A one-piece elastomeric furniture coupling device for securing a first furniture panel to a second furniture panel, the coupling device comprising a top head portion and a downwardly-extending stem portion. The top head portion comprises a front face plate and a body portion extending rearwardly from the front face plate. The front face plate is molded in the shape of an inverted truncated pyramid, with a lower edge of the face plate being shorter in width than an upper edge. The body portion conforms in shape to the front face plate resulting in a truncated frusto-conical shape. The body portion has a plurality of securing ridges along its surface, for secure attachment within a mortise drilled into a first furniture panel. The stem portion is substantially cylindrical and has a plurality of barbs along its outer surface for secure attachment within a hole drilled into a second furniture panel to be assembled with the first furniture panel.

10 Claims, 3 Drawing Sheets

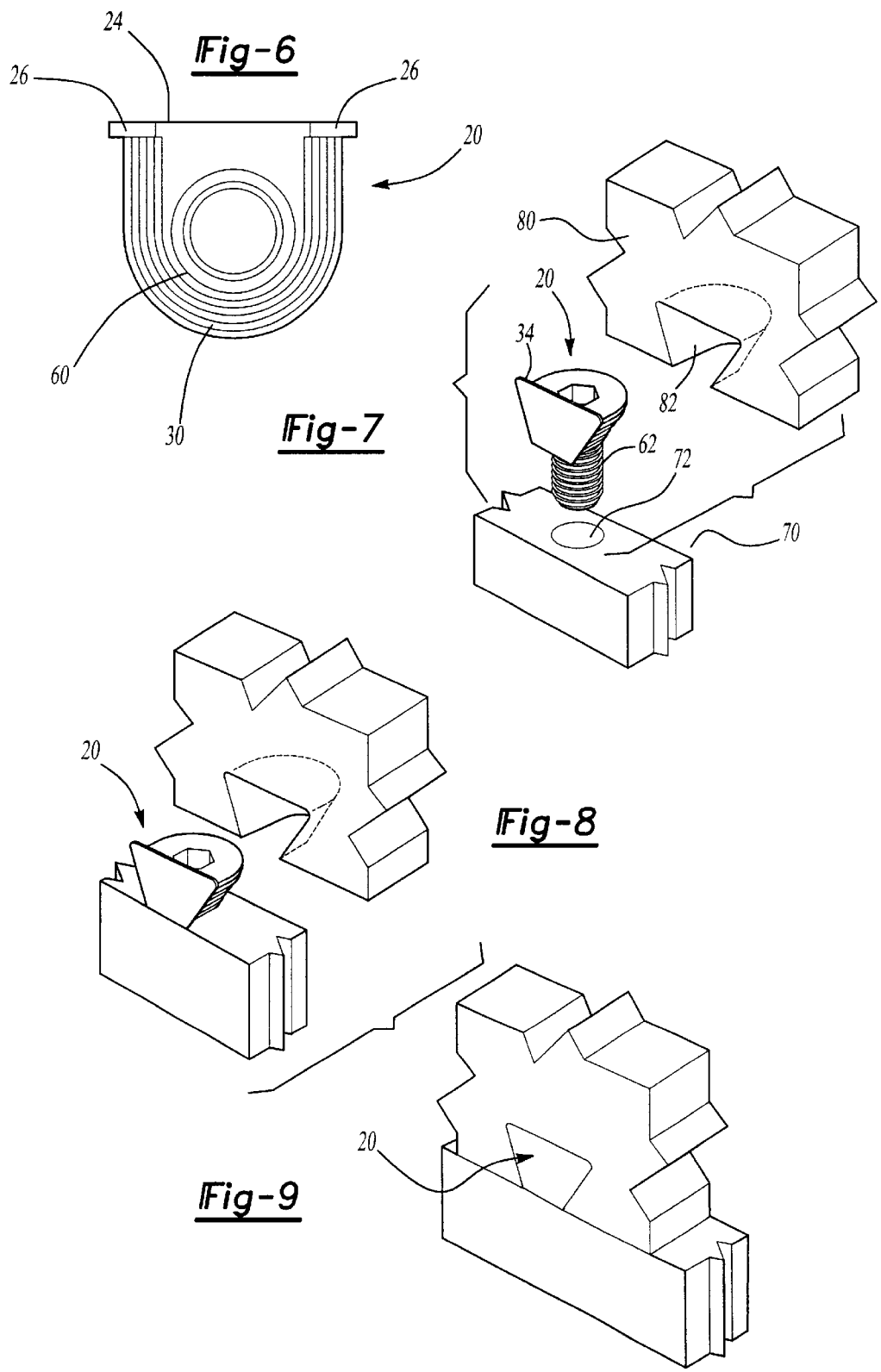

PANEL CONNECTOR

I. FIELD OF THE INVENTION

This invention describes a coupling assembly device used in the assembling of furniture, for joining or connecting two furniture elements, such as a side panel to a shelf, etc. This device enables the simple and fast assembly for furniture having parts made from wood to include wood panel, chipboard or particleboard, and medium density fiber ("MDF") board. The invention is equally suitable for use with polyurethane foam or any flat furniture board pieces.

II. BACKGROUND OF THE INVENTION

There are well known types of devices and/or procedures currently available for assembling furniture, both in the conventional fabrication of furniture as well as furniture sold in kits to be assembled by the customer, often referred to as "ready to assemble" furniture. One well-known method for attaching furniture is to simply use bolts to attach the furniture pieces together. This procedure is not preferred in areas where the furniture is visible to the customer. Another method for attaching furniture pieces is to attach metallic wedges screwed into one element or component, attach either a hook or peg to the other member, and to attach the two pieces by attaching the hook or peg onto the metallic wedge. Although this process is efficient, having to incorporate metallic pieces is expensive both in material costs and in additional labor costs.

Cylindrical peg or other wedges, made of wood or any other material, are also used to attach furniture panels. The peg is inserted into the different components of the furniture and secured therein using an adhesive. The peg or wedge is then inserted into a mating hole or receptacle within the second furniture piece. Although this procedure is relatively simple, the disadvantage is that the furniture cannot be handled until the adhesive glue is dry. A more sophisticated version of this method is provided in U.S. Pat. No. 4,893,958 to Wieland, in which a rod attached to one component of the furniture is inserted within a hole in the second furniture complement. Set screws are used to secure the rod within the second piece of furniture.

Another prior art device for joining furniture is disclosed in U.S. Pat. No. 4,163,618 to Giovannetti. There, a finned shank having an adjustable headpiece is inserted with a slot within the first wood panel. The adjustable headpiece is configured so as to receive a head on a metal pin, which is attached to the second wood panel. A locking coin is also provided to secure the head of the metal pin within the adjustable headpiece of the first wood panel. Although this method is relatively simple to use, it requires having three different components each adding cost to the overall assembly process. Further, the assembly time is significant.

This invention address the drawbacks found in the prior art by providing a relatively inexpensive single unit coupling device that may be assemble quickly and efficiently, thereby reducing both material and labor costs

III. SUMMARY OF THE INVENTION

The present invention discloses a one-piece coupling device, preferably of a molded plastic or elastomeric material. The coupling device comprises a head portion and a bottom stem portion. In the preferred embodiment of the invention, the head portion comprises a front surface or front facing plate, a back body, and a top surface. The front facing plate is smooth and molded in the shape of a truncated pyramid. The back body surface extends outwards from behind the front facing plate and has a stepped or grooved appearance. The top surface of the back body is flat and has a centrally located cavity to accommodate a number of positioning tools. The bottom stem portion extends downwards from the base of the back body and is substantially cylindrical. The bottom stem has annular saw-tooth fins on its surface.

In operation, when joining a first wood panel to a second wood panel, the stem portion of the instant coupling device is inserted within a hole drilled in the first wood panel. The operator or assembler next inserts a positioning tool, for example a screwdriver or Allen wrench, into the cavity on the top surface of the head portion, in order to align the coupling device for attachment to the second panel. The second panel, having drilled therein a pyramid shaped mortise corresponding to the shape of the top portion of the coupling device, is manually clamped onto the head portion of the coupling device. The saw-tooth fins on the surface of the stem portion provides for secure attachment to the first wood panel, even without the need for an adhesive, although an adhesive may be used. The truncated pyramid shape of the head portion ensures that, once inserted, the second wood panel is prevented from moving in the lateral or traverse plane and can only move vertically on or off the head portion. However, this vertical movement is restricted by virtue to the interference fit provided by the grooves around the back surface of the head portion. The smooth front surface is sized so as to be slightly larger than the mortise drilled into the second wood panel. Thus, the front portion serves as a stop to limit the distance the head portion is inserted within the mortise. Also, the oversized front surface completely covers the mortise, thereby improving the appearance of the joint.

Hence, the instant invention provides numerous advantages over the prior art. First, the furniture coupling device is inexpensive to produce. The coupling device is made from an elastomeric material, preferably via an injection molding process. Next, the instant coupling device reduces the actual furniture costs by reducing the number of pieces needed to assemble the furniture. The instant furniture coupling device employs a one-piece connector that can be used on wood, particleboard, chipboard and MDF panels, making it extremely versatile. Further, the instant coupling device is easy to use, either manually or in a mechanized assembly process, thus reducing assembly time and costs, and lowering the level of expertise needed to assemble the furniture. Also, the instant coupling device may be dyed almost any color to match the furniture wood panels to be joined. This makes the instant invention more aesthetically pleasing than its prior art counterparts.

Other objects, features and advantages of the invention will be apparent from the following detailed description taken in connection with the accompanying drawings.

IV. BRIEF DESCRIPTION OF THE DRAWINGS

The present invention will be more fully understood by reference to the following detailed description of a preferred embodiment of the present invention when read in conjunction with the accompanying drawings, in which like reference characters refer to like parts throughout the views and in which:

FIG. 6 is a bottom plan view of the coupling device;

FIG. 7 illustrates the coupling device in relation to the two wood pieces to be connected;

FIG. 8 illustrates the coupling device inserted into the first of two wood pieces to be connected;

FIG. 9 illustrates the coupling device connecting two wood pieces together;

V. DETAILED DESCRIPTION OF A PREFERRED EMBODIMENT OF THE PRESENT INVENTION

Figure 1:
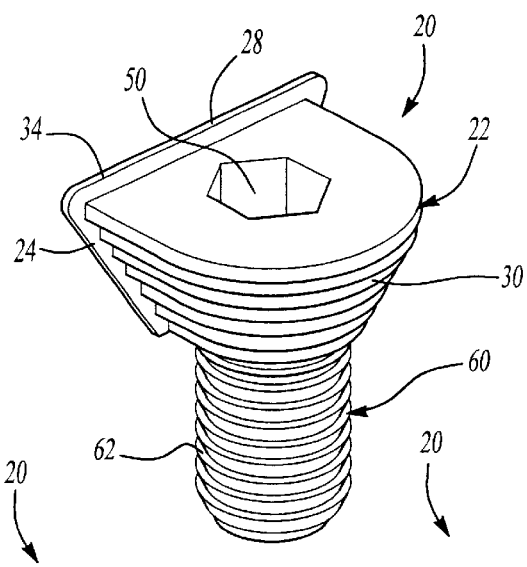
FIG. 1 is a perspective view of the furniture-coupling device of the instant invention.
Figure 2:
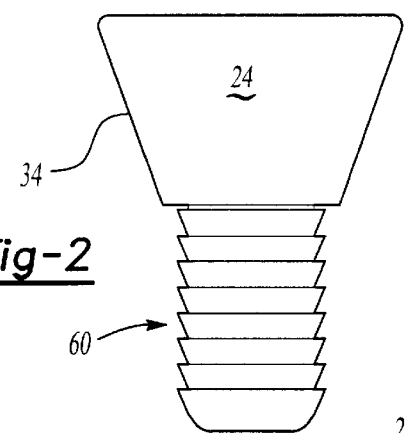
FIG. 2 is a front elevational view thereof.

FIG. 1 illustrates a preferred embodiment of the invention in which a furniture-coupling device 20 is shown. The furniture-coupling device 20 is preferably molded as a single unit out of a plastic or elastomeric material. Referring to FIG. 1, the coupling device 20 comprises a top head portion 22 and a bottom stem portion 60. In the preferred embodiment, as illustrated in FIG. 2, the top head portion 22 comprises a front faceplate 24 and a rearwardly extending back body portion 30. The front faceplate 24 is molded in the shape of an inverted truncated pyramid, having a bottom edge 26 of a first width and a top edge 28 of a second greater width.

Figure 3:
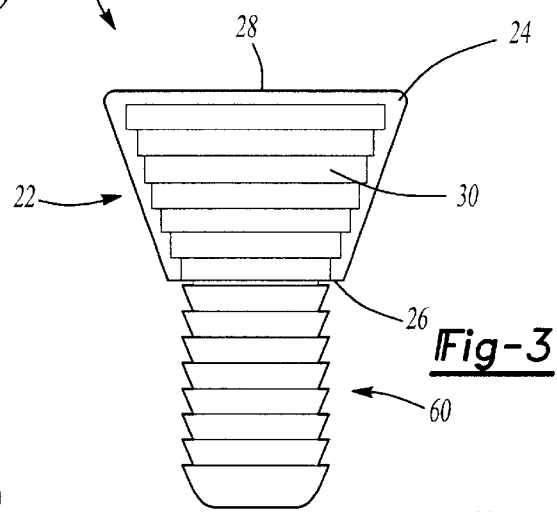
FIG. 3 is a back elevational view thereof.
Figure 4:
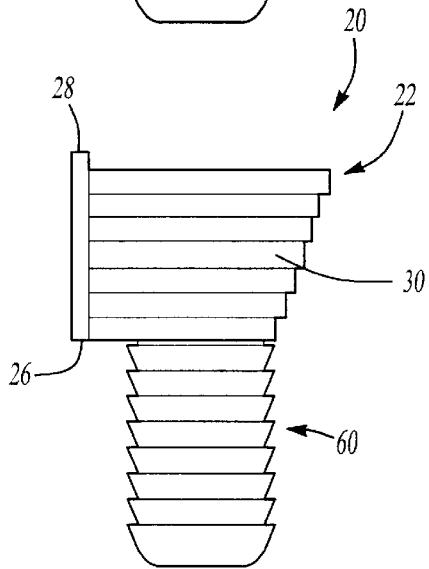
FIG. 4 is a side elevational view thereof.

The back body portion 30, best illustrated in FIGS. 3 and 4, extends outwards from behind the front faceplate 24, and forms a modified frusto-conical structure that substantially follows the contours of the front faceplate 24. The outside surface of the back body 30 is stepped in a series of ridges, thereby allowing for a more secure interference fit as the back body 30 is inserted into a corresponding mortise in a wood panel. As shown in FIG. 3, the front faceplate 24 extends beyond the perimeter of the back body 30 forming a peripheral rim 34.

Figure 5:
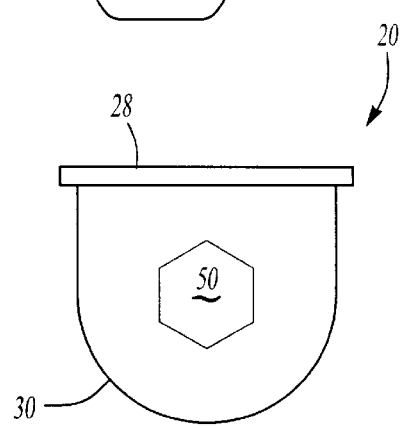
FIG. 5 is a top plan view of the coupling device.
Figure 10:
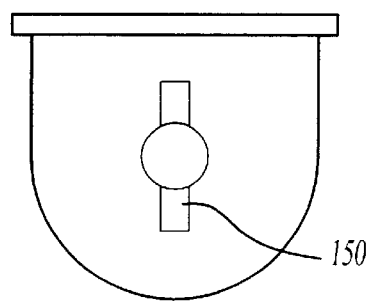
FIG. 10 is a top plan view of an alternate embodiment of the coupling device showing an alternate cutout configuration to accommodate the head of a screwdriver.

The top surface 40 of the back body 30 has a centrally located cavity 50 that is shaped so as to receive a positioning tool. As shown in FIG. 5, in a preferred embodiment of the invention, the cavity 50 has a hexagonal shape for receiving an Allen wrench. However, numerous other cavity configurations are possible. For example, FIG. 10 illustrates a cavity 150 that is configured to receive a flat-head screwdriver. The positioning tool allows an operator to align the furniture-coupling device 20 with the mortise for proper attachment to the wood panel.

Figure 11A:
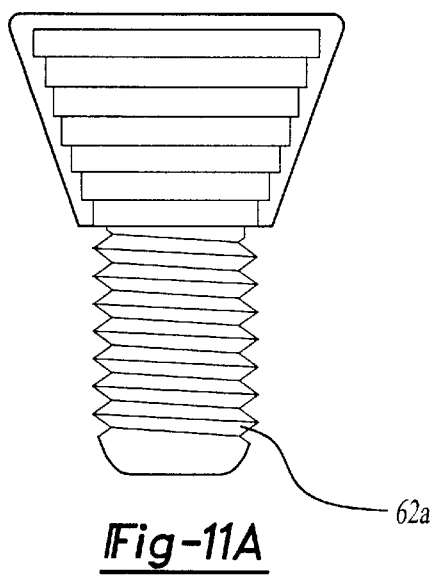
FIG. 11a is an elevational view of an alternate embodiment of the coupling device, illustrating a stem having screw thread thereon.
Figure 11B:
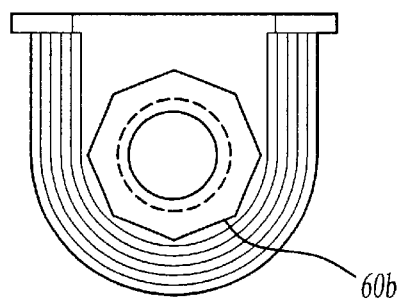
FIG. 11b is a cross-section through the stem portion of an alternate embodiment of the coupling device, illustrating an octagonal-shaped configuration.
Figure 11C:
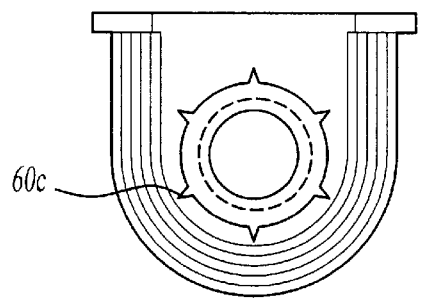
FIG. 11c is a cross-section through the stem portion of an alternate embodiment of the coupling device, illustrating a star-shaped configuration.

Referring to FIGS. 3 and 4, the stem 60 of the coupling device 20 extends downwards from the base of the back body portion 30. The actual shape and surface configuration of the stem 60 is not critical to the invention. However, in the preferred embodiment, the stem 60 is substantially cylindrical and has harpoon-like barbs 62 protruding from its surface. The barbs provide a more secure interference fit as the coupling device 20 is inserted into a wood panel via either a manual or a mechanical process. Alternate stem structures are illustrated in FIGS. 11a, 11b, and 11c. In FIG. 11a, the barbs 62 are replaced by screw threads 62a, thereby providing for the threaded attachment of the coupling device 20 to a wood panel. In FIG. 11b, the cross-sectional shape of the stem 60b is modified in the form of an octagon. The multiple sides help create the secure interference fit with the wood panel. FIG. 11c illustrates yet another modification to the stem 60c, in which the cross-sectional shape is modified to form a multi-pointed star having pointed projections extending from the multiple points of the star. Clearly, any suitable shape and surface configuration may be employed, provided that the wood panel is correspondingly configured to receive the coupling device.

Figure 12:
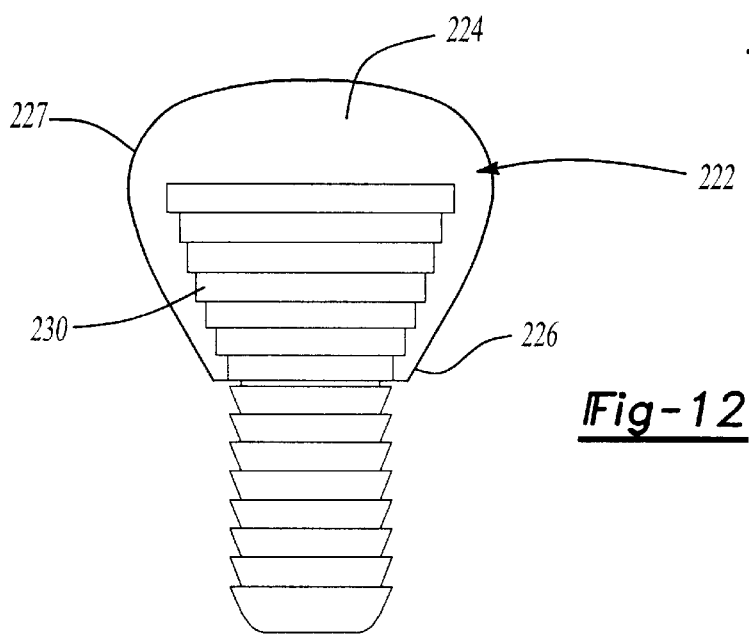
FIG. 12 is a front elevational view of an alternate embodiment of the coupling device, illustrating an alternate shape for the head portion.

As would be apparent to one skilled in the art, FIG. 12 illustrates an alternate top head portion 222 design. The bottom edge 226 of the faceplate 224 is sized so as to narrower that at least one section of the rest of the faceplate 224. As shown in FIG. 12, the faceplate 224 is shaped as a "bulb," with the width of the bottom edge 226 being narrower than the widest portion 227. The back body 230 extends outward from the faceplate 224 as previously described above. However, the precise shape of the back body 230 may vary independent of the faceplate 224. This allows the faceplate 224 to be molded in any shape to provide the desired aesthetic appearance.

The operation of the furniture-coupling device 20 is demonstrated by reference to FIGS. 7, 8, and 9. In FIG. 7, the coupling device 20 is shown in relation to wood panels 70 and 80 that are to be connected to each other, in this example, at right-angles to each other. A first wood panel 70 is prepared by drilling a hole 72 or receiving the coupling device 20. The hole 72 is placed near the edge of the wood panel 70 so that, once inserted, the rim 34 of the coupling device 20 may extend beyond the edge of the wood panel 70 allowing for flush attachment between the two panels. If required, an Allen wrench or screwdriver may be inserted into the cavity 50, 150 in the top surface 40 of the back body 30, in order to align the coupling device 20 for proper mating with the second panel 80.

The second panel 80 is prepared by drilling a mortise 82 at the edge of the panel 80. The mortise 82 is positioned to correspond to the hole 72 of panel 70. The stem 60 of the coupling device 20 is inserted into the hole 72 of the first wood panel 70. The coupling device 20 may be manually inserted into hole 72, or mechanically inserted as part of an automatic assembly process. The barbs 62 or other surface ensures a secure interference fit between the coupling device 20 and the first wood panel 70. If desired, an adhesive may be introduced into the hole 72 to more permanently anchor the coupling device 20.

Next, as shown in FIG. 8, the second panel 80 is mated with the first panel 70 by pressing the panel 80 against the coupling device 20 and inserting the back body 30 into the mortise 82. The ridges 32 on the surface of the back body 30 provide a secure interference fit between the coupling device 20 and the second wood panel 80. The front faceplate 24 acts as a stop as the back body 30 is inserted into the mortise 82. As with the first panel 70, an adhesive may be inserted into the mortise before introducing the coupling device 20. This will provide for a more permanent attachment between panels 70 and 80.

FIG. 9 illustrates the coupling device 20 as it secures wood panels 70 and 80 together. As shown in FIG. 9, the front facing plate 24 is sized so as to cover completely the mortise 82. This adds to the aesthetic appearance of the joint. Further, because the coupling device 20 is made from an elastomeric material, it is possible to dye the coupling device 20 almost any color to match the wood panels that are to be joined.

The foregoing detailed description has been given for clarity only and no unnecessary limitations should be understood therefrom as some modifications will be obvious to those skilled in the art without departing from the scope and spirit of the appended claims.

What is claimed is:

1. A device for assembling furniture, comprising:
    a top head portion having a front face plate and a body portion extending rearwardly from the front face plate,
    the front face plate of the top head portion being molded in the shape of an inverted truncated pyramid, with a lower edge of the front face plate being shorter in width than an upper edge,
    the body portion being adapted to be securely received within a mortise drilled into a first furniture panel to be assembled,
    a bottom stem extending downwards from the body portion of the top head portion, the bottom stem being receivable within a hole drilled into a second furniture panel to be assembled with the first furniture panel,
    wherein the front face plate is sized to be larger than the body portion so as to conceal a mortise drilled in the second furniture panel, and
    whereas the device is molded as a single piece from an elastomeric material.

2. The device for assembling furniture as described in claim 1, wherein the rearwardly extending body portion conforms to the shape of the front face plate, forming an inverted, truncated frusto-conical body, the surface of which has a plurality of securing ridges thereon, for secure attachment within the mortise in the second furniture panel, and wherein the body portion has a flat top surface containing a cavity therein, for receiving a positioning tool for aligning the device with the mortise.

3. The device for assembling furniture as described in claim 2, wherein the cavity contained within the flat top surface of the body portion is slotted to receive the blade of a screwdriver.

4. The device for assembling furniture as described in claim 1, wherein the downward extending bottom stem is substantially cylindrical, and has barbs along the outer surface for secure attachment within the hole in the first furniture panel.

5. The device for assembling furniture as described in claim 1, wherein the front face plate of the top head portion is molded in the shape of a bulb with a lower edge of the face plate being shorter in diameter than some portion of the face plate above the lower edge, and wherein the front face plate is sized to be larger than the body portion so as to conceal the mortise drilled in the second furniture panel.

6. The device for assembling furniture as described in claim 1, wherein the downward extending bottom stem has a polygonal cross-section for secure attachment within the hole in the first furniture panel.

7. The device for assembling furniture as described in claim 1, wherein the downward extending bottom stem is substantially cylindrical, and has screw threads around the outer surface for the threaded attachment within the hole in the first furniture panel.

8. A one-piece elastomeric furniture coupling device for securing a first furniture panel to a second furniture panel comprising a top head portion and a substantially cylindrical bottom stem portion, the top head portion comprising:
    a front face plate molded in the shape of an inverted truncated pyramid, with a lower edge of the front face plate being shorter in width than an upper edge;
    a back body portion having an outer surface and a top surface, the back body portion extending rearwardly from the front face plate and being contoured to conform to the shape of the front face plate, the back body portion further having a plurality of securing ridges along its surface for secure attachment within a mortise drilled into a first furniture panel and wherein the front face plate is sized to extend beyond the perimeter of the back body portion so as to conceal a mortise drilled in the first furniture panel;
    the bottom stem portion having an outer surface and extending downwards from the body portion of the top head portion, the bottom stem portion being receivable within a hole drilled into a second furniture panel to be assembled with the first furniture panel; and
    wherein the top surface of the body portion contains a cavity therein, for receiving a positioning tool for aligning the coupling device with the mortise in the first furniture panel.

9. The one-piece elastomeric, furniture coupling device as described in claim 8, wherein the outer surface of the bottom stem portion contains screw threads for the threaded engagement of the coupling device with the second furniture panel.

10. The connector of claim 8, wherein the bottom stem portion has an outer surface, the outer surface having barb-like projections thereon for secure attachment within the second furniture panel.

* * * * *